(12) United States Patent
Lim et al.

(10) Patent No.: US 7,161,799 B2
(45) Date of Patent: Jan. 9, 2007

(54) THERMAL INSULATING BOARD FOR LAPTOP COMPUTERS

(75) Inventors: Michael Z. Lim, 6507 Pacific Ave., Playa Del Rey, CA (US) 90293; Gregory Becker, Redondo Beach, CA (US)

(73) Assignee: Michael Z. Lim, Playa Del Ray, CA (US)

( * ) Notice: Subject to any disclaimer, the term of this patent is extended or adjusted under 35 U.S.C. 154(b) by 0 days.

(21) Appl. No.: 10/865,977

(22) Filed: Jun. 11, 2004

(65) Prior Publication Data

US 2005/0276006 A1 Dec. 15, 2005

(51) Int. Cl.
*G06F 1/16* (2006.01)
*B65D 19/00* (2006.01)

(52) U.S. Cl. .................... 361/683; 248/205.2; 428/462

(58) Field of Classification Search ........ 361/679–687, 361/724–727; 248/346.06, 205.2; 428/216, 428/236, 458, 462

See application file for complete search history.

(56) References Cited

U.S. PATENT DOCUMENTS

| 5,143,341 A | 9/1992 | Juster |
| 5,228,655 A * | 7/1993 | Garcia et al. ............... 248/118 |
| 5,263,423 A | 11/1993 | Anderson |
| 5,308,688 A * | 5/1994 | Holmquist .................. 428/216 |
| 5,340,075 A | 8/1994 | Schriner |
| 5,593,128 A | 1/1997 | Odom et al. |
| 5,623,869 A | 4/1997 | Moss et al. |
| 5,893,540 A | 4/1999 | Scott |
| 5,927,669 A | 7/1999 | Sassman |
| 5,937,765 A | 8/1999 | Stirling |
| 6,062,522 A | 5/2000 | Svegliato |
| 6,305,652 B1 | 10/2001 | Borke et al. |
| 6,368,693 B1 | 4/2002 | Livingstone et al. |
| 6,474,614 B1 | 11/2002 | MacEachern |
| 6,529,369 B1 | 3/2003 | Zarek et al. |
| 6,568,650 B1 | 5/2003 | Helmetsie et al. |
| 6,682,040 B1 * | 1/2004 | MacEachern ............ 248/349.1 |
| 2003/0071184 A1 | 4/2003 | Parkinson |
| 2003/0080264 A1 | 5/2003 | Helmetsie et al. |

OTHER PUBLICATIONS

The iGo ERGOSTAND, http://www.mobilitvelectronics.com/accessories/ErgoStand.htm.
The MaCally icepad, http://www.macally.com/spec/specialities/accessories/icepad.html.
Lapmate Portable Desk Advertisement.
Targus, Targus Notebook Chill Mat, Cools Notebook and Protects Desk Surface from Heat, package insert pages, product No. PA248U, bar code No. 092636-110772, Made in China, 2004, Targus Group International, Inc. and Targus Inc. Anaheim, CA 92806.

* cited by examiner

*Primary Examiner*—Hung Van Duong
(74) *Attorney, Agent, or Firm*—Fulwider Patton LLP

(57) ABSTRACT

The present invention is directed to a laptop platform for resting a laptop computer on a user's lap; the platform comprising a composite structure having risers to establish an air gap between the platform and the laptop. In one embodiment the platform is further configured with upper and lower layers including a plurality of ribs extending therebetween to define a pocket or pockets of air. The air pockets act as a second insulating source while the ribs aid in stiffening the platform. Further, a designated insulation material may be is adhered to the lower surface of the platform to create a third, separate barrier to heat transfer across the platform.

49 Claims, 4 Drawing Sheets

THERMAL INSULATING BOARD FOR LAPTOP COMPUTERS

BACKGROUND OF THE INVENTION

1. Field of the Invention

The present invention relates to the field of portable personal computers and more particularly to an insulating board or heatshield used in connection with a portable personal computer to shield the user's lap from heat generated by the computer.

2. General Background and State of the Art

The proliferation of portable personal computers, or laptop computers, is well documented. Laptop computers are used by business travelers to perform virtually all of the tasks enabled by desk top computers during previously unproductive hours traveling on airplanes, in hotels, and generally away from the office. Laptops also offer an alternative to bulkier, space consuming desk top models, with the opportunity to readily take the laptop to remote locations such as lectures, business meetings, or the like, and also to bring one's computer home in the evenings to continue working on projects. The reduction in the size and weight of today's laptops render them indispensable to travelers and business people around the world.

Laptop computers, like desk top computers, include a processing unit or chip that performs calculations used in the operation of the laptop. The processing unit generates a substantial amount of heat, and as processors grow more powerful and faster (in the multi-Gigahertz range) the amount of heat that the chips generate continues to increase. In most desktop computers, there are fans, heat sinks and adequate airspace to dissipate the heat generated by the processor. However, in a laptop computer there is very little room for large fans or open airspace, so heat is transferred through the underside of the computer where it comes in contact with the user's lap. The processors can produce up to 100 watts per square centimeter—the equivalent heat generated by a light bulb, and temperatures can easily reach 115° F. or more. The push for smaller and lighter laptop computers exacerbates the problem of heat dissipation. The heat problem is a byproduct of consumer demand for smaller, faster computers with reasonable battery life because large fans and extra airspace require larger units with reduced battery life. As a result, the underside of a laptop computer is notorious for being very warm or even hot to the touch when it has been running for a period of time.

Left unchecked, the heat build up of the laptop computer is transferred to the user at the point of contact where the laptop rests on the user's lap. As the laptop heats up, the build up of heat may become uncomfortable and can even result in pain. In this event, the user must endure the discomfort or discontinue operation of the laptop to allow the unit to cool down. Once cooled down, the laptop will once again begin to heat up to the point where discomfort requires another shutdown to allow further cooling. This repeating pattern of working followed by forced breaks to allow the computer to cool down is unproductive and can be disruptive, not to mention the discomfort involved. As a result, others have attempted to solve this problem through various methods.

For example, a product marketed by Macally U.S.A. of Irwindale, Calif. called the "IcePad" comprises a two panel hinged device that allows air to circulate between the laptop and the user. However, the Icepad is heavy and bulky—two significant shortcomings when traveling. In addition, the Icepad has grooves or channels for airflow along its bottom surface that create an uneven surface, and such uneven surfaces can become uncomfortable to the user after prolonged use. Also, U.S. Pat. No. 6,474,614 to MacEachern discloses a heat dissipating laptop support comprising a trapezoidal stand with stackable risers to allow air to pass through while tilting the laptop toward the user (see FIGS. 6 and 7). The laptop sits on a column of spacers that can adjust in height depending upon the number of spacers used. However, one risk in this device is that the spacers may become uncoupled and dislodged, causing the laptop to fall, and the device is ill-suited for adjusting to variable sized laptops. In addition, U.S. Patent Publication No. US 2003/0080264 to Helmetsie et al. discloses a laptop support with Velcro® fasteners that include louvers to circulate air between the laptop and the support. These louvers define grooves on the underside of the support that bear against the user and may become uncomfortable over time. The iGo ErgoStand offered by iGo® products (www.igo.com) is a notebook stand that claims to "raise(s) your notebook for a more comfortable typing position and viewing angle," and "increasing the airflow around your system allows it to run cooler." The device is designed for resting on a table rather than a user's lap, and the large opening in the 'X' pattern will not shield the laptop heat from the users lap if the Ergo Stand should be placed between the laptop computer and the user's lap. Small rubber pads at the end of the four corners are designed to mate to the bottom plastic surface of the laptop. They are not large enough to mate with the friction pads on the bottom of laptops that are positioned on various locations based on the size and make of the laptop. Also, the shape and plain shell structure (the bottom of the Ergo Stand is hollow) does not offer a large bending moment of inertia and hence would not likely offer sufficient structural support. Other devices are known for supporting a laptop to provide a stable platform, but none of the prior art devices are well suited for the combination of heat dissipation and comfort.

INVENTION SUMMARY

The present invention is directed to a lightweight composite thermal insulating board ("heatshield") for a laptop computer that shields heat from the user using multiple layers each adapted to provide rigidity and/or thermal protection while providing a comfortable contact surface for the user. In one embodiment, the composite insulating laptop board of the present invention comprises a first layer of thin plastic that gives the board a smooth, hard upper surface. The hardened plastic top layer preferably includes an underside comprising ribs beneath the surface that adds rigidity and stiffness to the board. A second layer of plastic encloses the ribs to create a pockets of air therebetween which act as an insulation layer, while this second plastic layer further solidifies the board. Alternatively, the ribs may be open at the sides to permit the circulation of air between the ribs. Underneath the second plastic layer can be an insulating material such as a foam, cloth, expanded polymeric material, or other suitable lightweight insulating material, to further inhibit heat from passing through the board. Alternatively, the insulating material can be sandwiched between the first and second layers rather than adhered to the bottom surface of the second layer.

In addition to the composite structure described above, the insulating laptop board can be configured on its upper surface with integral risers extending diagonally to the board's corners. The risers are adapted to support cooperating footpads on the base of a laptop to establish an air gap between the underside of the laptop and the upper surface of the board. Employing a diagonal or "X"-shaped arrangement of the risers allows the present invention to accommodate a variety of laptop sizes. Further, the integral nature of the risers eliminates any possibility that the risers can become dislodged or separate from the board. The continuous surface can be created with various manufacturing methods such as injection molding that creates a smooth, uninterrupted surface with varying elevations. To aid in supporting the laptop on the risers, each riser may also include an upwardly projecting wall that acts as a stop or catch. By strategically placing the footpads of the computer adjacent the walls of the risers, the laptop may be confined on the risers to resist sliding or shifting of the laptop on the board's upper surface during use. In addition, the risers may be equipped with a non-slip surface to engage the footpads of the laptop and prevent the laptop from sliding when in use. The invention thusly comprises a lightweight, sturdy, thermally insulating composite laptop board with a small profile and no moving parts.

DETAILED DESCRIPTION OF THE PREFERRED EMBODIMENTS

Figure 1:
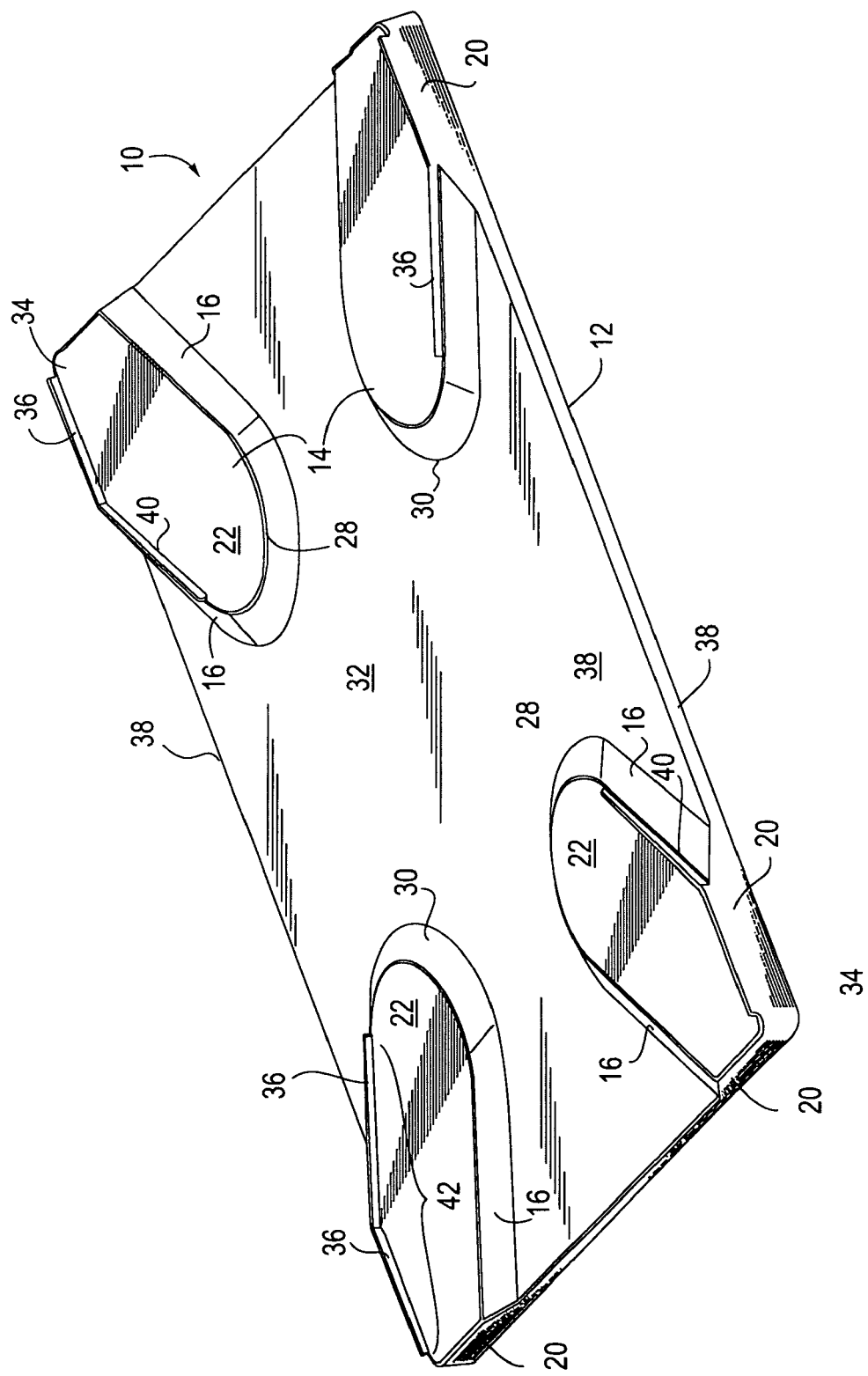
FIG. 1 is an elevated, perspective view of an embodiment of the present invention.
Figure 2:
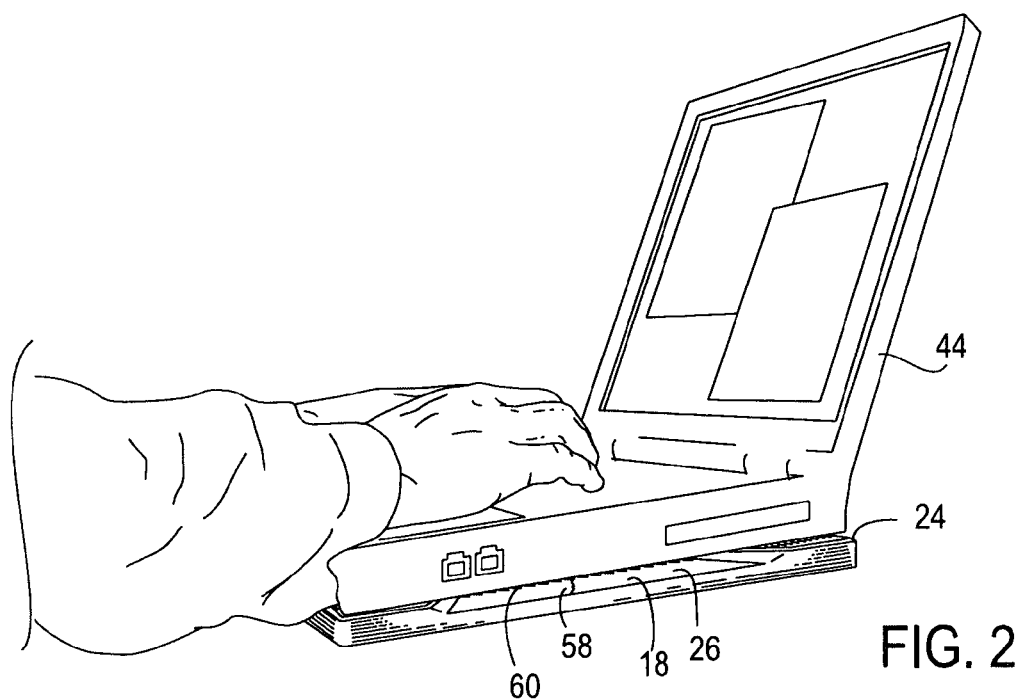
FIG. 2 is a perspective view of a laptop resting on the embodiment of FIG. 1.

An embodiment 10 of the heat shielding laptop board of the present invention is shown in FIGS. 1 and 2, which disclose a rigid, planar rectangular composite board having a first layer 12 with short platforms or steps, hereafter "risers", 14 diagonally extending to each corner in an "X"-shaped configuration. The risers 14 may be hollow so as to form a cavity therebelow, or the risers may be solid throughout. Each riser 14 may include inclined sides 16 located within the interior area 18 of the first layer 12 and vertical edges 20 along the board's perimeter. The flat top surface 22 of each riser 14 may be configured to be parallel to each other riser top surface 22 defining a second horizontal plane or elevation 24 parallel to the first horizontal plane or elevation 26 of the first layer 12. Alternatively, the top surfaces 22 and/or interior surface 18 may be angled with respect to each other for a more ergonomic-friendly positioning of the laptop, or the surfaces 22 may be oriented at different heights to allow for improved typing positions. Each top surface 22 of the risers 14 is preferably fitted with a non-slip material 28 adhered thereto, such as a rubber or polymer material used on the bottom surface of common mouse pads or other frictional surface. Alternatively, the top surface 22 may be made of a polymer material with non-slip surface characteristics. The risers 14 include a rounded first end portion 30 proximal to the center area 32 of the board 10, and a second corner shaped end portion 34 distal to the center area 32 of the board 10 and conforming with the corners of the board as shown in FIG. 1. Between the proximal end 30 and the distal end 34 of the risers 14, the beveled sides 16 may extend parallel to each other. Of course, the shape of the risers 14, their position on the board 10, as well as the shape and alignment of the beveled sides can be varied for numerous configurations without deviating from the scope of the invention.

Figure 3:
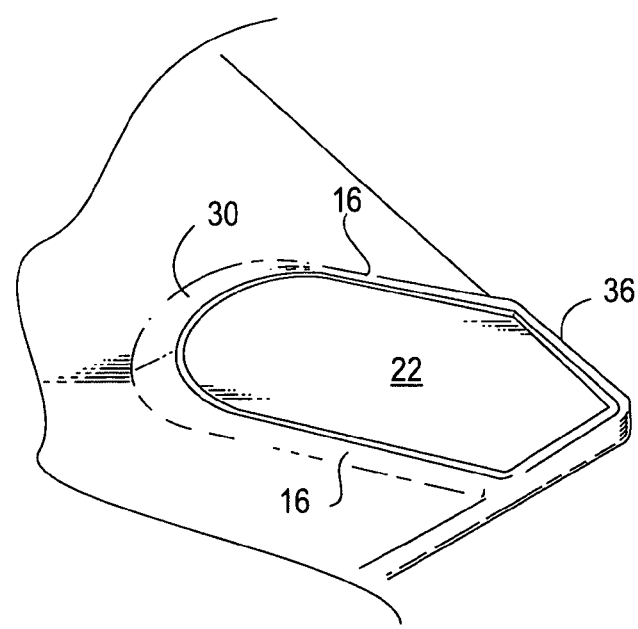
FIG. 3 is an enlarged, close-up view of a riser of the embodiment of FIG. 1.
Figure 4A:
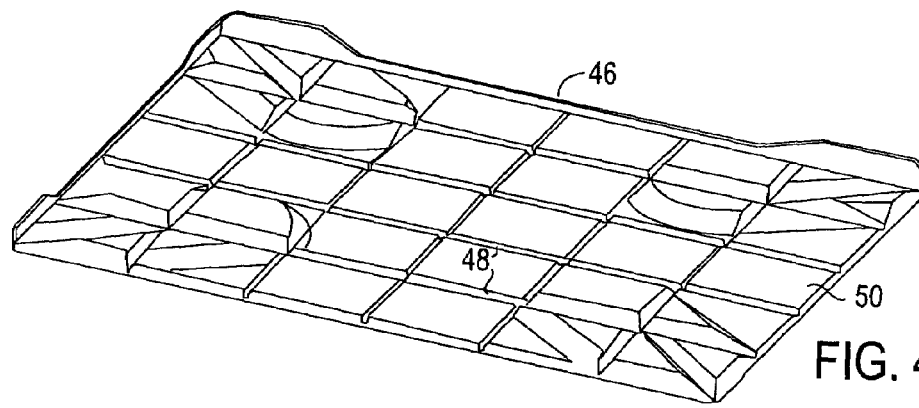
FIG. 4A is a lower perspective view of the first layer of the embodiment of FIG. 1.
Figure 4B:
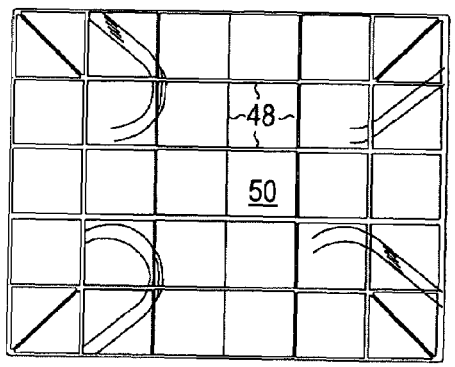
FIG. 4B is a bottom view of the first layer of the embodiment of FIG. 1.
Figure 4C:
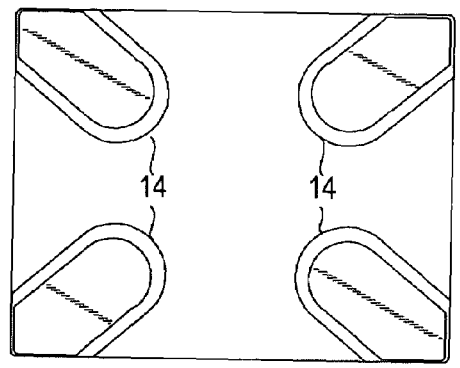
FIG. 4C is a top view of the first layer of the embodiment of FIG. 1.
Figure 4D:
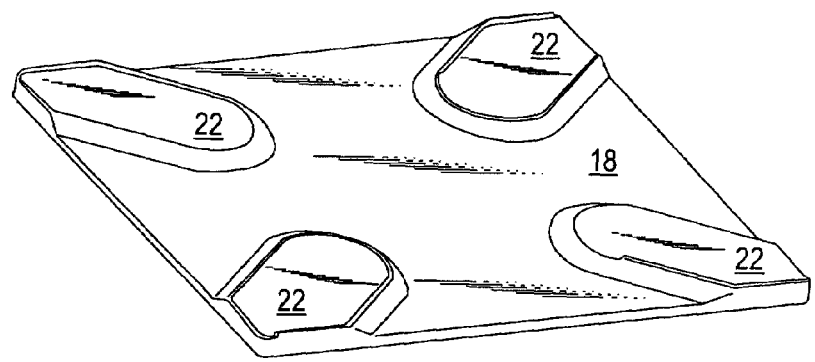
FIG. 4D is an elevated perspective view of the first layer of the embodiment of FIG. 1.

Risers 14 are shaped and dimensioned such that the bottoms of various sized lap tops can rest on surfaces 22 of risers 14. Each riser 14 can also include an upstanding wall or stop member 36 disposed on the flat top surface 22 along an outer peripheral edge coinciding with the longitudinal sides 38 of the board 10, where a portion 40 of wall member 36 angles inwardly from the outer peripheral edge and along the flat top surface 22 to bound a portion 42 of the perimeter of the riser's upper surface 22. The walls 36 cooperate to act as a stop for the laptop's foot pads (not shown) that project downward from underside of laptop 44. The angle of the inwardly directed portion 40 of the walls 36 is adapted to account for the most standard sizes of laptop computers, such that the footpads of the various computers 44 will bear against the walls 36, further preventing the laptop from shifting or sliding on the surface 22 of the riser 14. FIG. 3 illustrates an enlarged view of a riser 14 of the embodiment described above. As shown in FIG. 2 the risers 14 provide for an air gap 58 between the computer's bottom surface 60 and the upper surface 18 of board 10 for heat dissipation.

Figure 5:
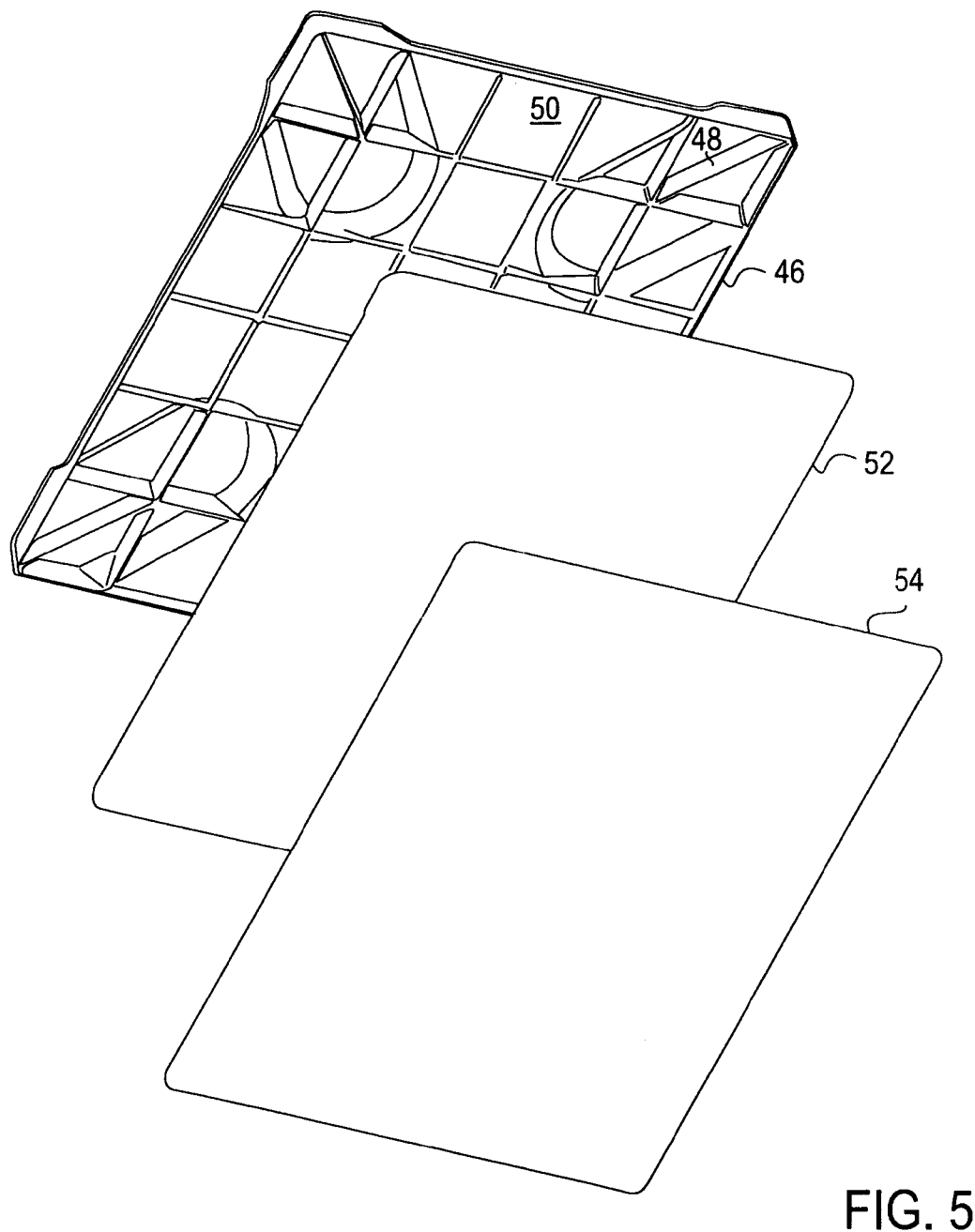
FIG. 5 is an exploded view of the composite layers of the embodiment of FIG. 1

FIGS. 4a–d illustrate several views of the top layer 12 of board 10. As shown in FIGS. 4a–d, the top layer 12 is preferably comprised of a thin plastic shell formed with the integral risers 14 on the upper surface 46 and a series of panels or ribs 48 on the underside 50. The risers 14 increase the bending moment of inertia of the first layer 12 and thus add stiffness to the board 10. The ribs 48 of the underside 50 portion of top layer 12 serve a dual purpose. The first purpose is to add stiffness to the overall board structure to prevent bending or flexing. The presence of the ribs increases the rigidity of the board. The second purpose is that the ribs form compartments that define air pockets therebetween, and the air pockets serve as an insulating mechanism to resist the passage of heat through board 10. Referring to FIG. 5, air is a well-known insulator and the trapped air within the composite board between the ribs 48 provide a barrier for transmitting heat across the board 10. As shown in FIG. 5 the air is trapped in a checkerboard pattern of air pockets. Other patterns such as a honeycomb pattern can be employed. In another embodiment, the ribs 48 do not form sealed compartments but rather the compartments formed by the ribs open at the vertical sides 38 of the first layer 12 allowing ventilation of the board's interior. In still another embodiment ribs 48 are not present. Instead, the sides 38 seal the underside 50 to form an insulating cavity between top layer 12 and second layer 52. The insulating cavity can also be a vacuum, gas filled, or can be fully or partially filled with insulating material such as insulating foam materials. Likewise, the ribbed embodiment can be similarly insulated.

The second layer 52 of board 10 may be a thin plastic counterpart shell to the first layer 12 for enclosing the ribs 48. The second layer 52 of the board 10 serves as an additional stiffening member in addition to enclosing the ribs 48 of the first layer 12 akin to a composite sandwich structure. In one embodiment, a thermal insulating third layer 54 is disposed beneath the second layer 52 as shown in FIG. 5. Layer 54 can be formed of neoprene, polymer, foam, cloth, or other insulation material. When the board 10 is placed on the user's lap, layer 54 can also serve as a frictional surface to resist slippage of the board when in use. Layer 54 can also be formed of a material that is comfortable to a user's bare skin and can be formed of a material that breathes or wicks away moisture. As shown in FIG. 5 the air is trapped in a checkerboard pattern of air pockets. Other patterns such as a honeycomb pattern can be employed. Alternatively, layer 54 can be omitted or sandwiched between the first and second layers 12 and 52. With the insulating layer 54 incorporated either internally or externally, the board 10 includes two layers 12 and 52 that cooperate to form the board 10, a layer of air pockets 50 defined by the ribs 48, and an insulating layer 54 that inhibits heat transfer across the board and provides a soft contact surface for the user. The vertical sides 38 of the first layer 12 extend around the periphery of first layer 12 and when joined with second layer 52 form a common periphery.

As discussed above, the present invention can include three or more insulating mechanisms that inhibit heat transfer across board 10 between the laptop and the user, in addition to the shell formed by the first and second layers 12 and 52. The three mechanisms include: the air gap 58 formed by the positioning of the laptop 44 on the risers 14; the air pockets 50 between the first layer 12 and second layer 52 of board 10 defined by the ribs 48; and an insulation layer 54 either sandwiched within the board between the first and second layers 12 and 52, or secured to the underside of the second layer 52. The insulating layer may also comprise a thin film of insulating material deposited on second layer 52.

In addition, a laptop positioned on the risers 14 will be inhibited from sliding or shifting when in use due to a non-slip surface 28 on the top surface 22 of each riser. Further, upstanding wall members 36 on the peripheral edge of each riser and extending inwardly along a riser serve as a stop or catch to secure the laptop on the board and prevent movement of the laptop. The positioning of the risers and particularly the upstanding wall members 36 allow for variable sized laptops to be used with a single embodiment of the invention.

While the specification describes particular embodiments of the present invention, those of ordinary skill can devise variations of the present invention without departing from the inventive concept. For example, it should be appreciated that the board 10 can be made of various materials including polymers and composites. Further, the first layer 12 may be made of the same material as the second layer 52, or the two layers may be constructed from two different materials. Moreover, while the board 10 is illustrated in FIG. 1 as having a rectangular shape, other shapes that conform to the shape of various laptops may be employed. Other departures from the description above will be readily apparent to one of ordinary skill in the art, and the scope of the invention is intended to include all such variations.

We claim:

1. A laptop board comprising:
a first layer having an upper surface and an underside, the upper surface being substantially planar and further including a plurality of risers thereon adapted to displace a laptop seated thereon from the upper surface and each riser having a top surface, and the underside including a plurality of downwardly projecting ribs defining air pockets therebetween;
a second layer adjacent the underside of the first layer and enclosing the air pockets therebetween; and
a third layer adjacent the second layer, said third layer comprising a thermal insulating material.

2. The laptop board of claim 1 wherein said first layer is rectangular and said risers are disposed substantially at each corner.

3. The laptop board of claim 1 wherein said risers each include an upwardly projecting wall adjacent an outer perimeter and extending from said top surface defining a stop for engagement with a lower surface of a laptop.

4. The laptop board of claim 1 wherein said risers comprise a rounded proximal end with respect to a center portion of the first layer and parallel sides diagonally connecting said rounded end to a distal end.

5. The laptop board of claim 1 wherein the risers include bevel-shaped edge portions.

6. The laptop board of claim 1 wherein said ribs are arranged in a checkerboard configuration.

7. The laptop board of claim 1 wherein said ribs are arranged in a honeycomb configuration.

8. The laptop board of claim 1 wherein said risers are integral with the upper surface of the first layer.

9. The laptop board of claim 1 wherein said risers are hollow and form a cavity therebelow.

10. The laptop board of claim 1 wherein each riser includes a non-slip material adhered to the top surface of the riser.

11. The laptop board of claim 1 wherein the third layer includes a non-slip material.

12. The laptop board of claim 2 wherein the third layer includes a non-slip material.

13. The laptop board of claim 3 wherein said upwardly projecting walls extending from said top surface of said risers include a first portion parallel with an adjacent edge of the first layer and a second portion angled inwardly toward a center portion of the first layer.

14. A laptop board comprising:
an upper panel having a first elevation defined by a first plane of the board and a second elevation defined by a second plane, said second plane vertically displaced from said first plane;
wherein the second elevation is formed by at least one step on the upper panel and adapted to displace a laptop seated thereon from said first elevation to define an air gap therebetween;
a lower panel having a smooth, substantially planar contour and top and bottom surfaces, said top surface of said lower panel adjoined to the upper panel at a common periphery thereof;
an air pocket disposed between said upper and lower panels; and
a layer of thermal insulating material substantially covering said bottom surface of said lower panel and adhered thereto.

15. The laptop board of claim 14 wherein the step is formed by a plurality of raised surfaces defining the second elevation.

16. The laptop board of claim 14 further comprising a plurality of ribs disposed between said upper and lower panels for stiffening the laptop board.

17. The laptop board of claim 14 wherein the second elevation includes a non-slip material.

18. The laptop board of claim 14 wherein said layer of thermal insulating material includes a non-slip material.

19. The laptop board of claim 15 wherein the raised surfaces comprise elongate risers extending diagonally from a center portion of the upper panel.

20. The laptop board of claim 19 wherein each riser includes a non-slip material.

21. The laptop board of claim 19 wherein the risers include an elongate, upwardly extending stop disposed along a first edge of said raised surface.

22. The laptop board of claim 19 wherein said risers have a proximal end and a distal end with respect to a central portion of the upper panel, and wherein the proximal end has a rounded configuration and the distal end forms a corner of the upper panel.

23. A laptop board comprising:
a first layer having a substantially planar upper surface with four diagonally extending risers formed thereon adapted to displace a laptop seated thereon from the upper surface, and each riser including a substantially planar upper surface substantially parallel to and vertically displaced from the planar upper surface of the first layer, said risers including a slip-resistant region on said riser planar upper surface;
a plurality of downwardly projecting ribs formed on the first panel at a lower surface;
a second panel with an upper and lower surface with the upper surface coupled to the first panel and enclosing said ribs; and
the second panel including thermally insulating material adjacent the second panel for resisting heat transfer across the plane of the board.

24. The laptop board of claim 23 wherein said ribs define air pockets therebetween, and said second panel encloses said ribs and said air pockets therebetween.

25. The laptop board of claim 23 wherein the thermally insulating material includes a non-slip material.

26. The laptop board of claim 23 wherein each riser includes a non-slip material adhered to the top surface of the riser.

27. A laptop board comprising:
a first layer having an upper surface and an underside, the upper surface being substantially planar and further including a plurality of risers thereon adapted to displace a laptop seated thereon from the upper surface; and
a second layer having an upper surface and an underside with the upper surface of the second layer adjacent the underside of the first layer enclosing a cavity therebetween.

28. The laptop board of claim 27 including a third layer adjacent the underside of the second layer, said third layer comprising a thermal insulating material.

29. The laptop board of claim 27 wherein said underside of said first layer includes a plurality of downwardly projecting ribs; and
said second layer encloses said ribs between said first and second layers.

30. The laptop board of claim 27 wherein the second layer includes a non-slip material.

31. The laptop board of claim 29 wherein said downwardly projecting ribs define a plurality of air pockets therebetween, and said second layer is disposed adjacent said first layer enclosing said air pockets therebetween.

32. The laptop board of claim 27 wherein each riser includes a non-slip material.

33. The laptop board of claim 28 wherein the third layer includes a non-slip material.

34. The laptop board of claim 32 wherein the second layer includes a non-slip material.

35. A laptop board comprising:
a first layer having an upper surface and an underside, the upper surface being substantially planar and further including a plurality of risers thereon adapted to displace a laptop seated thereon from the upper surface, and the underside including a plurality of downwardly projecting ribs;
a second layer having an upper surface and an underside with the upper surface of the second layer adjacent the underside of the first layer; and
a third layer adjacent the underside of the second layer, said third layer comprising a thermal insulating material.

36. The laptop board of claim 35 wherein said downwardly projecting ribs define air pockets therebetween, and said second layer encloses the air pockets between said first and second layers.

37. The laptop board of claim 35 wherein the third layer includes a non-slip material.

38. The laptop board of claim 35 wherein each riser includes a non-slip material.

39. A laptop board comprising:
a first layer having an upper surface and an underside, the upper surface being substantially planar and further including a plurality of risers thereon adapted to displace a laptop seated thereon from the upper surface and each riser having a top surface, and the underside including a plurality of downwardly projecting ribs defining air pockets therebetween; and
a second layer adjacent the underside of the first layer and enclosing the air pockets therebetween.

40. The laptop board of claim 39 further comprising a thermally insulating material on said second layer.

41. The laptop board of claim 39 wherein each riser includes a non-slip material adhered to the top surface of the riser.

42. A laptop board comprising:
an upper panel having a first elevation defined by a first plane of the board and a second elevation defined by a second plane, said second plane vertically displaced from said first plane;
wherein the second elevation is formed by at least one step on the upper panel and adapted to displace a laptop seated thereon from said first elevation to define an air gap therebetween;
a lower panel having a smooth, substantially planar contour and top and bottom surfaces, said top surface of said lower panel adjoined to the upper panel at a common periphery thereof; and
an air pocket disposed between said upper and lower panels.

43. The laptop board of claim 42 wherein said lower panel comprises a non-slip material.

44. The laptop board of claim 42 wherein each step includes a non-slip material.

45. The laptop board of claim 43 wherein said lower panel further includes a thermally insulating material.

46. A laptop board comprising:
a first layer having an upper surface and an underside, the upper surface being substantially planar and further including a plurality of risers thereon adapted to displace a laptop seated thereon from the upper surface, and the underside including a plurality of downwardly projecting ribs; and
a second layer having an upper surface and an underside with the upper surface of the second layer adjacent the underside of the first layer.

47. The laptop board of claim 46 wherein said second layer comprises a non-slip material.

48. The laptop board of claim 46 wherein each riser includes a non-slip material adhered to the top surface of the riser.

49. The laptop board of claim 47 wherein said second layer further includes a thermally insulating material.

* * * * *